(12) United States Patent
Wankawala et al.

(10) Patent No.: US 8,935,207 B2
(45) Date of Patent: Jan. 13, 2015

(54) INSPECTING REPLICATED DATA

(71) Applicants: Pranav Wankawala, Sunnyvale, CA (US); Yingyu Chen, Shanghai (CN); Hermann Lueckhoff, Sunnyvale, CA (US); Jun Shi, Palo Alto, CA (US)

(72) Inventors: Pranav Wankawala, Sunnyvale, CA (US); Yingyu Chen, Shanghai (CN); Hermann Lueckhoff, Sunnyvale, CA (US); Jun Shi, Palo Alto, CA (US)

(73) Assignee: SAP SE, Walldorf (DE)

( * ) Notice: Subject to any disclaimer, the term of this patent is extended or adjusted under 35 U.S.C. 154(b) by 148 days.

(21) Appl. No.: 13/767,299

(22) Filed: Feb. 14, 2013

(65) Prior Publication Data

US 2014/0229442 A1   Aug. 14, 2014

(51) Int. Cl.
*G06F 7/04* (2006.01)
*G06F 17/30* (2006.01)
*G06F 3/06* (2006.01)

(52) U.S. Cl.
CPC .......... *G06F 17/30581* (2013.01); *G06F 3/065* (2013.01); *G06F 17/30575* (2013.01)
USPC ........... 707/639; 707/812; 707/690; 707/702; 707/703

(58) Field of Classification Search
CPC .............. G06F 3/065; G06F 17/30575; G06F 17/30581
See application file for complete search history.

(56) References Cited

U.S. PATENT DOCUMENTS

| | | |
|---|---|---|
| 5,937,414 A | 8/1999 | Souder et al. |
| 7,953,698 B2 | 5/2011 | Beck et al. |
| 8,024,294 B2 | 9/2011 | Kottomtharayil |
| 8,051,209 B2 | 11/2011 | Zenz et al. |
| 8,073,922 B2 | 12/2011 | Bates |
| 8,086,566 B2 | 12/2011 | Edlund et al. |
| 8,332,390 B2 | 12/2012 | Yan et al. |
| 8,417,669 B2 | 4/2013 | Xu et al. |
| 2003/0208511 A1 | 11/2003 | Earl et al. |
| 2007/0255763 A1 | 11/2007 | Beyerle et al. |
| 2008/0114816 A1 | 5/2008 | Shepherd |
| 2011/0099147 A1 | 4/2011 | McAlister et al. |
| 2012/0185432 A1 | 7/2012 | Ding |
| 2013/0124473 A1* | 5/2013 | Gutberlet et al. ............. 707/634 |
| 2013/0124475 A1 | 5/2013 | Hildenbrand et al. |
| 2013/0159249 A1 | 6/2013 | Dewall et al. |
| 2013/0227254 A1* | 8/2013 | McCallum .................... 712/228 |
| 2014/0208028 A1* | 7/2014 | Coronado et al. ............ 711/118 |
| 2014/0244586 A1* | 8/2014 | Ngo .............................. 707/639 |

\* cited by examiner

*Primary Examiner* — Bruce Moser
(74) *Attorney, Agent, or Firm* — Brake Hughes Bellermann LLP (57) ABSTRACT

Disclosed is system for monitoring data changes during a data replication process. The system includes a modeling module configured to select tables and fields to be monitored during execution of the data replication process, a trigger module configured to track changes of data being generated during execution of a program by inserting triggers into a destination system at the start of a program execution and then dropping the trigger at the end of program execution, a snapshot module configured to track changes of data being generated during execution of a program by generating a snapshot of data at the beginning and the end of program execution, and a report module configured to generate a report indicating changes in data based on the changes in data indicated by the triggers and based on the changes in data indicated by the snapshots of data.

20 Claims, 8 Drawing Sheets

FIG. 8 ized by the name and a prepositional phrase (e.g., "destination or target server by a data replication tool (e.g., SAP landscape transformation (SLT)).").

INSPECTING REPLICATED DATA

BACKGROUND

1. Field

This description relates to a method, system and computer readable medium for detecting data integrity and inconsistence issues when replicating data in data storage and data processing systems.

2. Related Art

Many different kinds of replication tools are used to move data from a source application (e.g., enterprise resource planning (ERP)) running on, for example, database systems (e.g., Oracle™, MS-SQL™, and the like) into a destination application running on another database system. For example, moving data from traditional applications running on traditional database systems into an In-Memory database (e.g., high-performance analytic appliance (HANA)).

The HANA (e.g., SAP™ HANA) may be a data warehouse appliance for processing high volumes of operational and transactional data in real-time. HANA may use in-memory analytics, an approach that queries data stored in random access memory (RAM) instead of on hard disk or flash storage. A common problem when moving (e.g., replicating) data using a replication tool is a lack of data integrity and data inconsistency.

For example, replication tools are reactive in nature. Certain actions that happen on the source device or application cause an appropriate reaction from the replicator tool. Typically, the action would be an insert to a database, which is logged via database log files, database triggers or scanning via polling. Once a change is identified, the reaction is typically to copy all the relevant data and replicate the data into the destination system.

Replication tools may perform this task in a sequential generic manner. For example, when a change is detected in the source device or application, the replication tool queues the changes and replicates the changes in the destination device or application. Replication may not consider transactional integrity. Because the replication tool does not consider transactional integrity, a logical unit of work in an application including data across 4-5 different tables is replicated into the destination device or application in a completely random fashion. For example, in one scenario an ideal sequence for data replication may be Header, Line1, Line2, SubLine1.1, Subline 1.2 (as created in the source system). However, during replication the data gets created on the destination device or application in the sequence Line1, Header, Subline 1.1, SubLine1.2, Line2. As a result, data integrity issues may be present at some point in time during replication.

In addition, typically data may be continuously replicated from the source device or application to the destination device or application. If a program is being executed on the destination device or application, and updates are made on the table, these changes do not get reflected in the executing program, leading to incorrect results. As a result, data inconsistency issues may be present during program execution.

Further, typically during replication table locking may be necessary. In order to guarantee the data consistency and integrity, applications may use a lock mechanism. Traditional "SELECT FOR UPDATE" or "SELECT . . . LOCK" are effective for single server case (both on-line transactional processing (OLTP) and on-line analytical processing (OLAP) on same server). However, in the case of multiple servers (e.g., OLTP on enterprise core component (ECC) and OLAP on HANA), the traditional lock mechanism may be ineffective because all the data is replicated from source server to destination or target server by a data replication tool (e.g., SAP landscape transformation (SLT)). The replication tool is unable to run analysis on the destination or target server while locking the corresponding data rows on source server to prevent changes.

SUMMARY

One embodiment includes a system for monitoring data changes during a data replication process. The system includes a modeling module configured to select tables and fields to be monitored during execution of the data replication process, a trigger module configured to track changes of data being generated during execution of a program by inserting triggers into a destination system at the start of a program execution and then dropping the trigger at the end of program execution, a snapshot module configured to track changes of data being generated during execution of a program by generating a snapshot of data at the beginning and the end of program execution, and a report module configured to generate a report indicating changes in data based on the changes in data indicated by the triggers and based on the changes in data indicated by the snapshots of data.

Another embodiment includes a method for monitoring data changes during a data replication process. The method includes receiving an indication that a program execution has started, generating an initial data snapshot of replicated data, receiving an indication that a program data has posted, generating a final data snapshot of the replicated data, and generating a report based on the initial data snapshot and the final data snapshot.

Another embodiment includes a method for monitoring data changes during a data replication process. The method includes receiving an indication that a program execution has started, generating a trigger on at least one table associated with the program, executing the trigger such that data changes are logged, receiving an indication that a program data has posted, deleting the trigger, and generating a report based on the logged data changes.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Example embodiments address the above described problems utilizing detection and reporting. Example embodiments provide the user (e.g., of the replication tool) a tool which identifies possible data integrity issues and possible data inconsistency issues in a user system and generates a report in order to inform the user of the possible data integrity issues and the possible data inconsistency issues.

Accordingly, example embodiments may create snapshots of a destination device or application in a replication process at different points in time and then generates a comparative report between different snapshots. A user (of a replication tool) may choose tables, fields and the time points when the snapshots may be taken as well as when the report may be generated. As a result, detection of changes that may have occurred between two distinct points in time may be possible (and reported).

Example embodiments may log the data changes (e.g., via snapshot/logging tables) and generate a report of the changes that have taken place in the destination device or application which enables the user to make informed decisions, and possibly remedy problems resulting from the possible data integrity issues and the possible data inconsistency issues.

Example embodiments include a system for monitoring data changes during a data replication process. The system includes a modeling module configured to select tables and fields to be monitored during execution of the data replication process, a trigger module configured to track changes of data being generated during execution of a program by inserting triggers into a destination system at the start of a program execution and then dropping the trigger at the end of program execution, a snapshot module configured to track changes of data being generated during execution of a program by generating a snapshot of data at the beginning and the end of program execution, and a report module configured to generate a report indicating changes in data based on the changes in data indicated by the triggers and based on the changes in data indicated by the snapshots of data.

Figure 1:
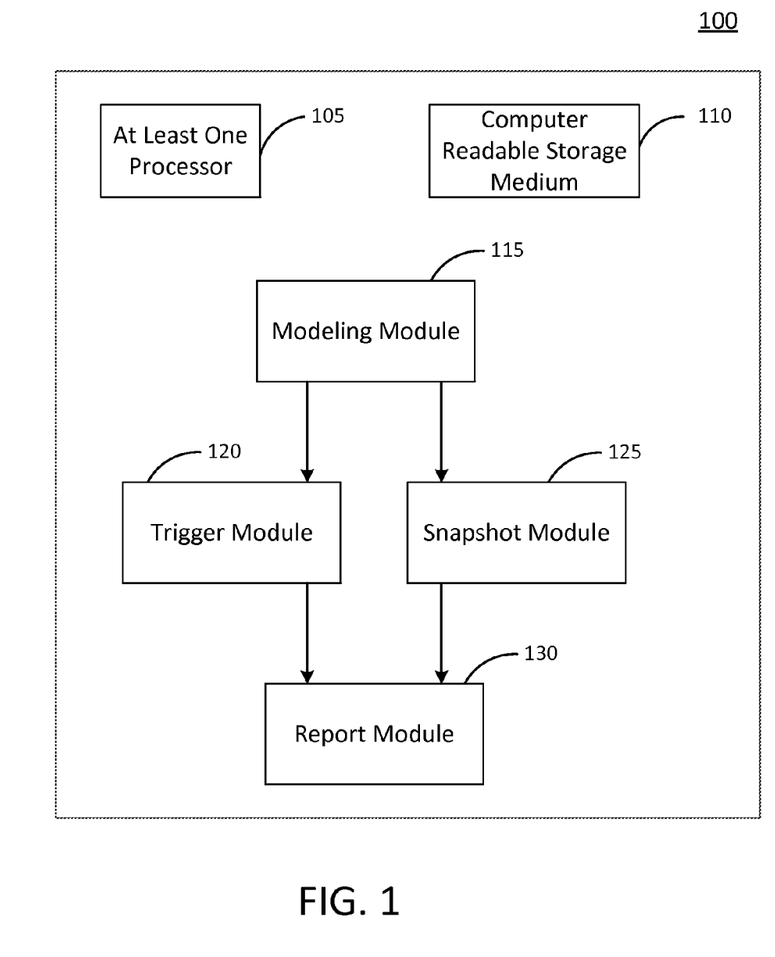
FIG. 1 illustrates a block diagram of a system according to one or more example embodiments.

FIG. 1 illustrates a block diagram of a system according to one or more example embodiments. As shown in FIG. 1, the system 100 includes a modeling module 115, a trigger module 120, a snapshot module 125 and a report module 130.

In the example of FIG. 1, the system 100 may be at least one computing device and should be understood to represent virtually any computing device configured to perform the methods described herein. As such, the system 100 may be understood to include various standard components which may be utilized to implement the techniques described herein, or different or future versions thereof. By way of example, the system 100 is illustrated as including at least one processor 105, as well as a computer readable storage medium 110.

Thus, as may be appreciated, the at least one processor 105 may be utilized to execute instructions stored on the computer readable storage medium 110, so as to thereby implement the various features and functions described herein, or additional or alternative features and functions. Of course, the at least one processor 105 and the computer readable storage medium 110 may be utilized for various other purposes. In particular, it may be appreciated the computer readable storage medium 110 may be understood to represent an example of various types of memory and related hardware and software which might be used to implement any one of the modules described herein.

In some embodiments, the system 100 may include one or more of a stand-alone device, a stand-alone module, a server, a network, a data center, a software and/or hardware system, a virtual system, a system defined based on Advanced Business Application Programming (ABAP), an application, and/or so forth. In some embodiments, the system 100 may be referred to as a target and/or destination system.

The modeling module 115 may be configured to select tables and fields to be monitored during execution of a replication process. For example, the modeling module 115 may take as input each table and field (e.g., column of the table) of each table as well as a user input in order to generate a data monitor model to be monitored. The tables and fields may be associated with a data store (e.g., a database) to be replicated. The user input may include selecting the fields (or a subset of the fields) in each table (or a subset of tables) via a user interface (not shown). The user may make the selections as an element of a replication process (e.g., as an element of a replication application) and/or as a standalone application in combination with a replication process.

Once the table(s) is selected, keys associated with the table(s) may be identified (and/or defined) and the fields for the data monitor model may be selected. For example, numeric fields may be selected because numeric fields may represent data where a change could affect allocation (e.g., quantity and prices). In addition, date fields may be used for the purpose of selecting rows. Further, the modeling module 115 may be configured to identify/assign relationships between tables in a hierarchical fashion (e.g., Header1 may be a table with a primary key to which tables LineItem1, LineItem2, LineItem3 have a foreign key references to). The relationships between models may be included in the data monitor model.

The trigger module 120 may be configured to track changes of data being generated during execution of a program by inserting triggers into a destination and/or target system at the start of a program execution and then dropping the trigger at the end of program execution. The trigger module 120 may be configured to track changes such that system 100 may check for inconsistent data. The trigger may be generated based on the data monitor model generated by the modeling module 115. The trigger module 120 may utilize the trigger(s) and a log table to store changes in data such that system 100 may identify changes that occur during a program execution, log the identified changes (e.g., in a log table) such that the system 100 may detect inconsistencies in the replicated data.

The snapshot module 125 may be configured to track changes of data being generated during execution of a program by generating a snapshot of data at the beginning and the end of program execution. The snapshot module 125 may be configured to track changes such that system 100 may check for data integrity. For example, snapshot module 125 may generate key-value hash pairs. For example, snapshot module 125 may generate one hash out of a key field associated with a table and another hash value from the non-key fields. The key field associated with a table and the non-key fields may be determined based on the data monitor model. In order to generate the hash a group by on the key fields may be performed and an average may be executed over the non-key (e.g., numeric) fields. The snapshot module 125 may concatenate all the key fields in one column and the value fields in another column in order to generate a key-value hash pair. The resultant key-value hash pair may be stored in a table (e.g., Snap_Table described below).

The report module 130 may be configured to generate a report indicating changes in data. For example, the report may be based on the log table storing changes in data as generated by the trigger module 120. For example, the report may be based on the key-value hash pairs stored in a table as generated by the snapshot module 125. The report may include all or a portion of the entries in the log table as generated by the trigger module 120. The report may include a comparison of sequential key-value hash pairs stored in the table as generated by the snapshot module 125. The report may include both the entries in the log table and a comparison of sequential key-value hash pairs.

Each of the modules described above may be executed as software code stored in a memory (e.g., computer readable storage medium 110) associated with system 100 and executed by a processor (e.g., the at least one processor 105) associated with system 100. For example, the processor may be associated with one or more of the modules (e.g., the modeling module 115 or the snapshot module 125). However, alternative embodiments are contemplated. For example, the modules may be embodied as an application-specific integrated circuit, or ASIC. For example, the ASIC may be configured as one or more of the modules (e.g., the modeling module 115 or the snapshot module 125). However, alternative embodiments are contemplated.

Figure 2:
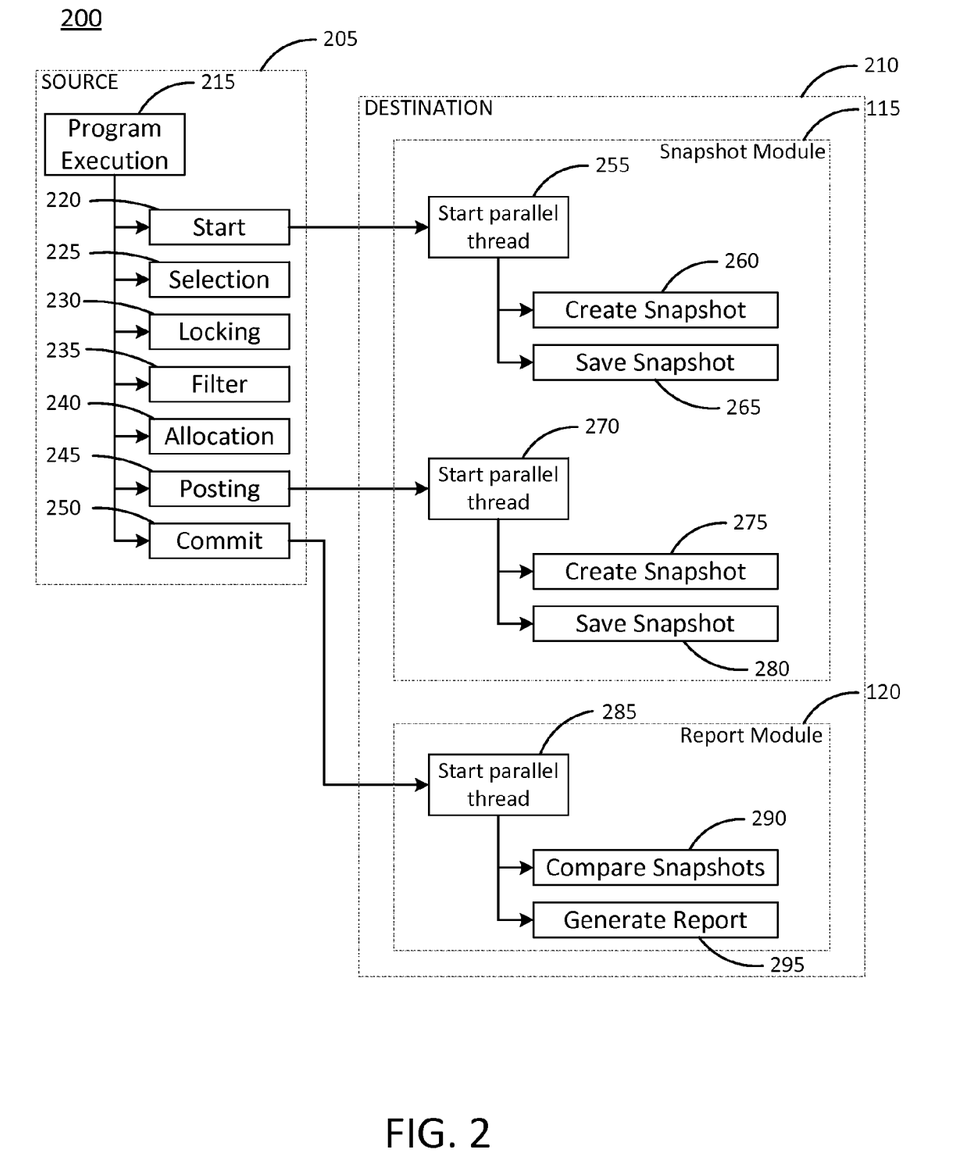
FIG. 2 illustrates a block diagram of a system according to one or more example embodiments.

FIG. 2 illustrates a block diagram of a system according to one or more example embodiments. As shown in FIG. 2, the system 200 includes a source 205 and a destination 210. The source 205 includes a program execution block 215. The program execution block 215 includes an associated start block 220, an associated selection block 225, an associated locking block 230, an associated filter block 235, an associated allocation block 240, an associated posting block 245 and an associated commit block 250. The source 205 may be any data store application, system, hardware and the like. For example, the source 205 may be an enterprise resource planning (ERP) application (e.g., SAP™ ERP) running on, for example, database systems (e.g., Oracle™, MS-SQL™, and the like). The destination (or target) 210 may be an In-Memory database (e.g., high-performance analytic appliance (HANA)) on which data from the source 205 is to be replicated.

The program execution block 215 may be associated with any executable program that may add or change data. For example, the program execution block 215 may be associated with an order entry or order change in an ERP. The start block 220 may be associated with the start of the executable program. The start block 220 may represent a time at which the executable program begins. The start block 220 may generate an indication that the executable program has begun via, for example, a message sent to the destination 210. The selection block 225 may be associated with selecting a table in which to update or insert data. The locking block 230 may be associated with locking the table such that no other data associated with the table can change while the executable program is updating or inserting data.

The filter block 235 may select a row in the table for updating or inserting data. The allocation block 240 allocates the memory for storing the updated or inserted data. The posting block 245 temporarily stores the data. The posting block 245 may generate an indication that the data has posted via, for example, a message sent to the destination 210. The commit block 250 permanently (as relates to the current data change) stores the data. For example, data that is posted but not committed may eventually be lost. The commit block 250 may generate an indication that the data has been committed via, for example, a message sent to the destination 210.

The destination 210 includes the snapshot module 115 and the report module 120. The snapshot module 115 further includes an associated start parallel thread block 255, an associated create snapshot block 260, an associated save snapshot block 265, another associated start parallel thread block 270, another associated create snapshot block 275 and another associated save snapshot block 280. The report module 120 further includes an associated start parallel thread block 285, an associated compare snapshot block 290 and an associated generate report block 295.

Threads may be sub-processes where tasks that belong to a program (or multiple related programs) can run simultaneously. Depending on the number of processors (e.g., at least one processor 105) available and the number of competing threads, some of those threads actually may run in parallel on different processors, whilst in other cases simultaneous execution may be achieved by swapping threads in and out of the available processors. Typically, a part of operating system called the thread scheduler decides which threads to allocate processor time to (and on which processor) and when.

Therefore, start parallel thread blocks 255, 270 and 285 each may initiate a new thread on which to execute. The new threads may execute in parallel to the application performing the replication. Start parallel thread block 255 may initiate create snapshot block 260 and save snapshot block 265 in response to an indication by the start block 220 that a program execution has started. Create snapshot block 260 may be an initial snapshot of data before the executed program has changed (or has the opportunity to change) any data. Create snapshot block 260 generates a snapshot as discussed in more detail below. The save snapshot block 265 saves the snapshot in a snapshot table (e.g., Snap_Table described below).

Start parallel thread block 270 may initiate create snapshot block 275 and save snapshot block 280 in response to an indication by the posting block 245 that a program execution has posted data. Create snapshot block 275 may be a final snapshot of data after the executed program has changed (or has the opportunity to change) any data. Create snapshot block 275 generates a snapshot as discussed in more detail below. The save snapshot block 280 saves the snapshot in the snapshot table (e.g., Snap_Table described below) with a different identification than the save snapshot block 265.

Start parallel thread block 285 may initiate compare snapshot block 290 and generate report block 295 in response to an indication by the commit block 250 that a program execution has committed data. The compare snapshot block 290 may compare, for example, sequentially stored snapshots in order to determine if any data has changed. For example, if two sequential snapshots are compared and determined to include different data, generate report block 295 may generate a report including an indication of the different data. The report may include the data key so that the data can be looked at in the destination or target system 210.

Figure 3:
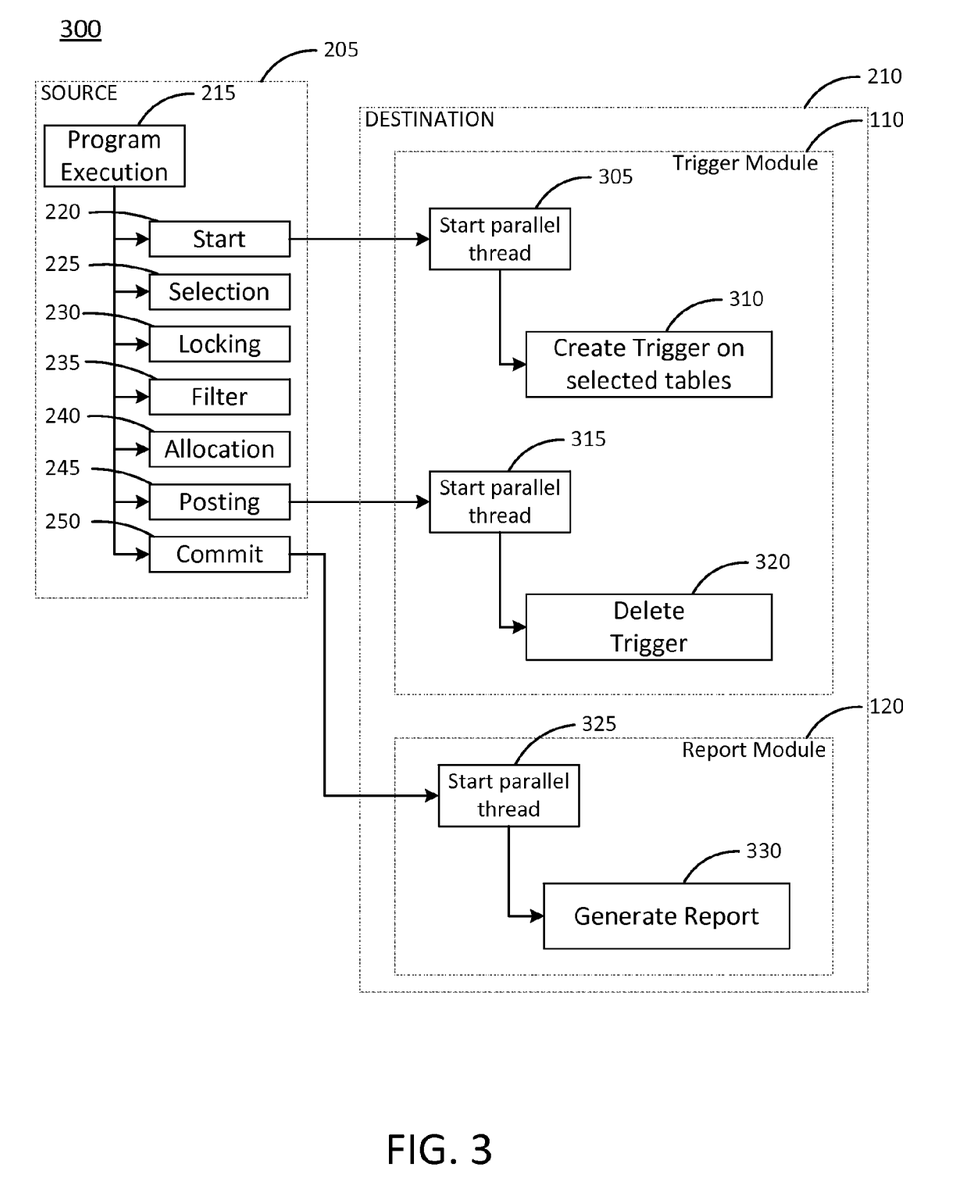
FIG. 3 illustrates a block diagram of a system according to one or more example embodiments.

FIG. 3 illustrates a block diagram of a system according to one or more example embodiments. As shown in FIG. 3, the system 300 includes the source 205 and the destination 210. The source 205 includes the program execution block 215. The program execution block 215 includes the associated start block 220, the associated selection block 225, the associated locking block 230, the associated filter block 235, the associated allocation block 240, the associated posting block 245 and the associated commit block 250 (each described in more detail above with regard to FIG. 2). Like numbers refer to like elements and will not be described in further detail for the sake of brevity.

The destination 210 includes the trigger module 110 and the report module 120. The trigger module 110 further includes an associated start parallel thread block 305, an associated create trigger on selected tables 310, another associated start parallel thread block 315, and an associated delete trigger block 320. The report module 120 further includes an associated start parallel thread block 325, and an associated generate report block 330.

Start parallel thread blocks 305, 315 and 325 each may initiate a new thread on which to execute. The new threads may execute in parallel to the application performing the replication. Start parallel thread block 305 may initiate create trigger on selected tables 310 in response to an indication by the start block 220 that a program execution has started. The trigger may be utilized to store data changes in a log table such that system 100 may identify changes that occur during a program execution. The trigger may log the identified changes (e.g., in the log table) such that the system 100 may detect inconsistencies in the replicated data. For example, the trigger may log the data key of the table (e.g., orders table) and store the key in the log table.

Start parallel thread block 315 may initiate delete the trigger block 320 in response to in response to an indication by the posting block 245 that a program execution has posted data. Delete the trigger block 320 may delete the trigger inserted by the create trigger on selected tables 310. As one skilled in the art will appreciate, triggers may be created permanently on all the tables. However, leaving a trigger on for the entire duration of replication causes additional load on a system (e.g., system 100) affecting performance. Preferably, creating and dropping the trigger and such that the trigger functions during the time period of program execution results in improved system performance.

Start parallel thread block 325 may initiate generate report block 330 in response to an indication by the commit block 250 that a program execution has committed data. For example, the generate report block 295 may generate a report including an indication of the different data stored in the log table. The report may include the data key so that the data can be looked at in the destination or target system 210. For example, the log table may be deleted (e.g., dropped) upon completion of the generation of the report.

Figure 4:
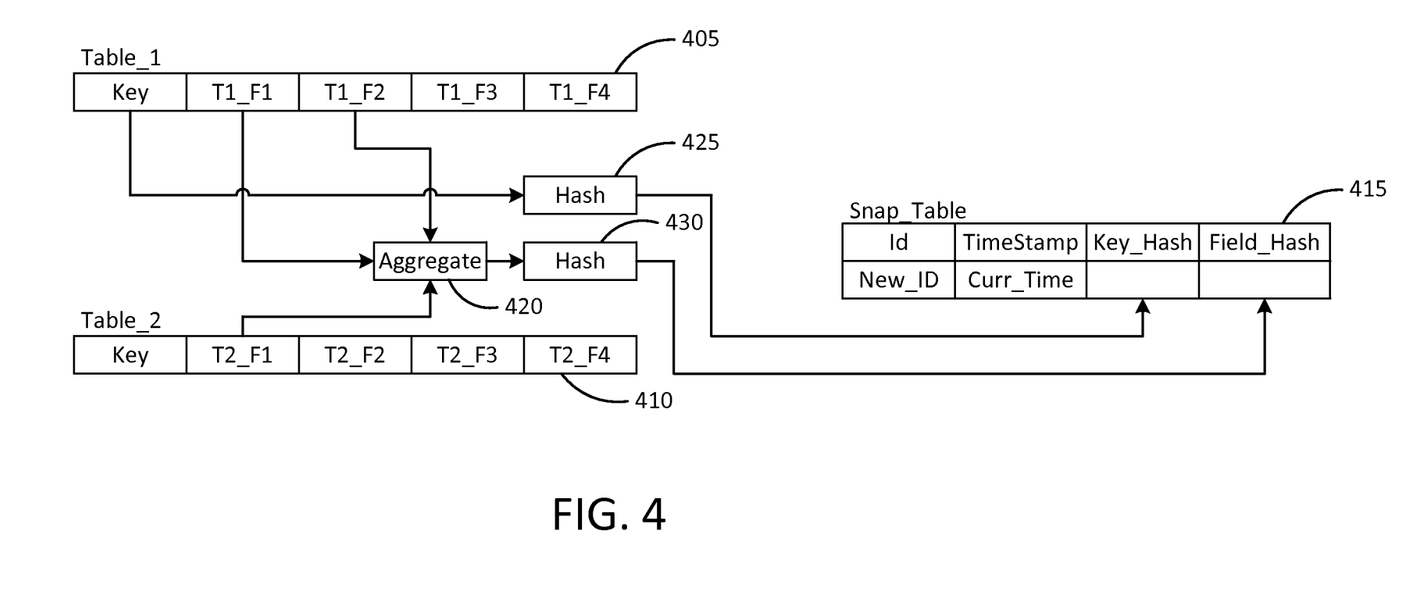
FIG. 4 illustrates a block diagram showing a relationship between replicated tables and a snapshot table according to one or more example embodiments.

FIG. 4 illustrates a block diagram showing a relationship between replicated tables and a snapshot table according to one or more example embodiments. As shown in FIG. 4, there is a relationship between a first table Table_1 405, a second table Table_2 410 and a snapshot table Snap_Table 415. Although only two tables (e.g., Table_1 405 and Table_2 410) are shown, example embodiments are not limited thereto.

Each table (e.g., Table_1 405, Table_2 410 and Snap_Table 415) includes a number of fields. For example, Table_1 405 includes four fields (e.g., T1_F1, T1_F2, T1_F3, and T1_F4). For example, Table_2 410 includes four fields (e.g., T2_F1, T2_F2, T2_F3, and T2_F4). For example, Snap_Table 415 includes four fields (e.g., Id, TimeStamp, Key_Hash, and Field_Hash). Although the aforementioned fields are shown, example embodiments are not limited thereto.

FIG. 4 further shows an aggregate block 420 and two hash blocks 425, 430. The aggregate block 420 may be configured to select and append data fields from one or more tables. The aggregate block 420 may select the data fields based on the data monitor model. As shown in FIG. 4, the aggregate block 420 may select fields T1_F1 and T1_F2 from Table_1 405 and T2_F1 from Table_2 410. The aggregate block 420 may append each of these data fields with each other. The aggregate block 420 and the hash blocks 425, 430 may be elements of, for example, snapshot module 125. The aggregate block 420 and the hash blocks 425, 430 may be stand alone elements or modules.

The two hash blocks 425, 430 may be configured to use a hash function to generate a new value based on the input. For example, a hash function may take a group of characters and map the group of characters to a value of a certain length. The hash value is representative of the original string of characters, but is typically smaller than the original. One example of a hash function is called folding. Folding takes an original value, divides it into several parts, then adds the parts and uses the last four remaining digits as the hashed value. Another example is called digit rearrangement. Digit rearrangement takes the digits in certain positions of the original value, such as the third and sixth numbers, and reverses their order. Digit rearrangement then uses the number left over as the hashed value.

Hash block 425 may be configured to use the hash function of the Key value associated with the one or more tables. For example, hash block 425 may be configured to use the hash function on the Key value for Table_1 405 and Table_2 410. Hash block 430 may be configured to use the hash function on the output of the aggregate block 420.

Snap_Table 415 may be configured to store entries as generated by, for example, snapshot module 125. For example, Snap_Table 415 may be configured to store the output of hash blocks 425 and 430. In addition, each entry is identified by a unique identifier New_ID. Further, the timestamp may be an entry in a data field of Table_1 405 or Table_2 410. Alternatively, the timestamp may be generated by, for example, snapshot module 125 upon generation of a new entry in the Snap_Table 415.

FIGS. 5-8 illustrate methods according to one or more example embodiments. As one skilled in the art will appreciate, the method steps described with regard to FIGS. 5-8 may be executed as software code stored in a memory associated with system 100 and executed by a processor (e.g., the at least one processor 105) associated with system 100. For example, the processor may be associated with one or more of the modules (e.g., the modeling module 115 or the snapshot module 125). However, alternative embodiments are contemplated.

For example, the method steps may be performed by an application-specific integrated circuit, or ASIC. For example, the ASIC may be configured as one or more of the modules (e.g., the modeling module 115 or the snapshot module 125). Although the steps described below are described as being executed by a processor (e.g., the at least one processor 105), the steps are not necessarily executed by a same processor. In other words, at least one processor may execute the steps described below with regard to FIGS. 5-8.

Example embodiments provide a customizable tool for the checking of parameters for tables and columns. For example, a configuration mechanism may allow a user to define a data object and define which columns should be included during integrity check and inconsistency check. The customized check may not include all the columns in a table or all tables in a database application. As a result, (in cases of large tables or many tables) the performance impact on the data replication may be minimized.

Figure 5:
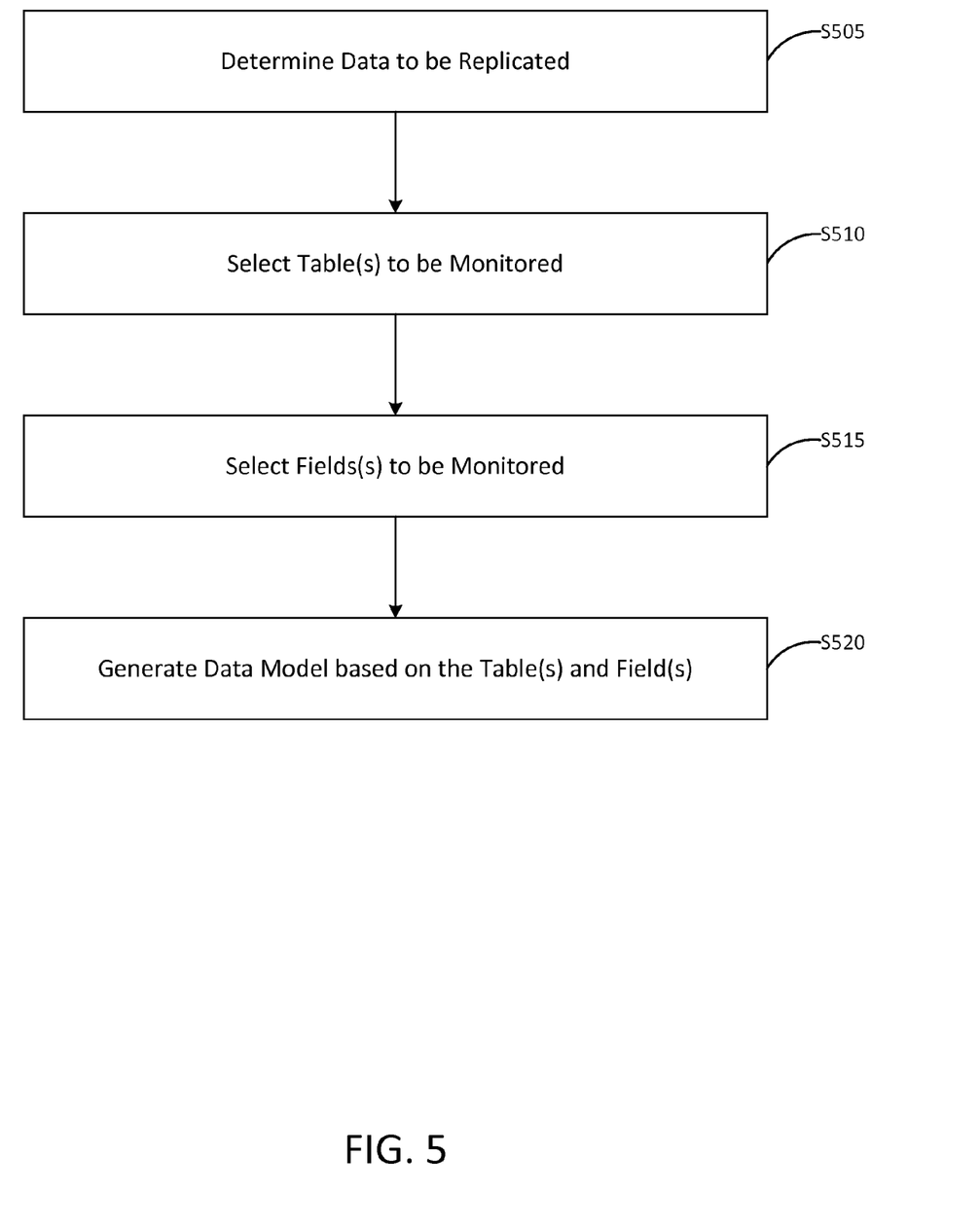
FIG. 5 illustrates a method according to one or more example embodiments.

FIG. 5 illustrates a method according to one or more example embodiments. The steps of FIG. 5 may be performed by a processor associated with a destination device (e.g., destination device 210). Alternatively (or in addition to), the steps of FIG. 5 may be performed by a processor associated with a source device (e.g., source device 205). For example, the steps of FIG. 5 may be performed by a processor (e.g., at least one processor 105) associated with the modeling module 115. As shown in FIG. 5, in step S505 the processor determines data to be replicated. For example (with reference to FIG. 4) the processor may determine data associated with a database including Table_1 405 and Table_2 410 is to be replicated.

In step S510 the processor selects at least one table to be monitored. For example (with reference to FIG. 4) the processor may select data associated with Table_1 405 and Table_2 410 as tables to be monitored.

In step S515 the processor selects at least one field to be monitored. For example (with reference to FIG. 4) the processor may select data associated with fields T1_F1 and T1_F2 from Table_1 405 and T2_F1 from Table_2 410 as data fields to be monitored. Further, the processor may select at least one key field associated with the at least one field to be monitored.

In step S520 the processor generates a data monitor model based on the monitored table and field. For example, the processor generates the data monitor model to include fields T1_F1 and T1_F2 from Table_1 405 and T2_F1 from Table_2 410. The data monitor model may be stored in a table associated with system 100.

As another example, suppose database associated with an ERP includes a table called VBAP. This table may have fifty (50) columns and three (3) are key fields. For generating a data monitor model a user would select the three key fields and some numeric fields. For example, fields MANDT, VBELN and POSNR may be the key fields and the numeric fields NETPR, KWMENG and BRGEW may be fields which are needed for monitoring changes. The data monitor model may include the numeric fields NETPR, KWMENG and BRGEW with MANDT, VBELN and POSNR being selected as the key fields.

Figure 6:
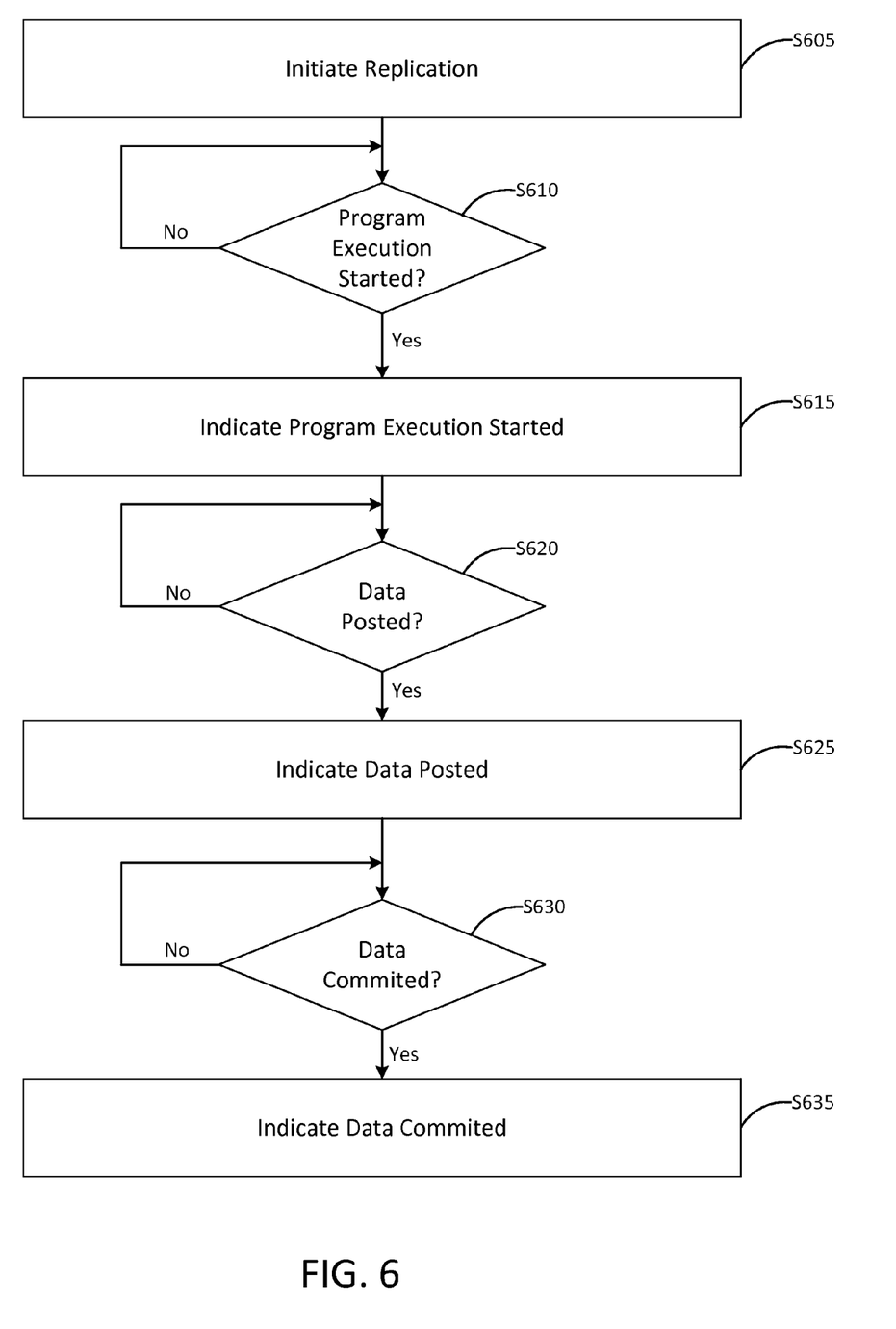
FIG. 6 illustrates a method according to one or more example embodiments.

FIG. 6 illustrates a method according to one or more example embodiments. The steps of FIG. 6 may be performed by a processor associated with a source device (e.g., source device 205). As shown in FIG. 6, in step S605 the processor initiates a replication. For example, the processor may be executing a known replication application (e.g., SAP landscape transformation (SLT)). Database replication is the electronic copying data from a database in one computer or server to a database in another computer or server. Database replication may be performed by (1) copying data to another server, or to another database on the same server, (2) combining data from two or more databases into a single database, and/or (3) receiving full initial copies of a database and then receiving periodic updates as data changes.

In step S610 the processor determines if a program execution has started. For example, the program execution may include updating or creating a customer order in an ERP. Therefore, starting program execution may include detecting the start of a program that changes data associated with a table (being replicated) (e.g., a customer order table). If a program execution has not started processing loops back to step S610. Otherwise, processing continues to step S615.

In step S615 the processor indicates the program execution has started. For example, the processor may generate a message. The message including an indication of program execution and what program has started. For example a message may be transmitted to a destination or target system (e.g., destination system 210). The destination or target system may be the system on which the data is being replicated.

In step S620 the processor determines if data has posted. Posting data may include temporarily storing the data. The data may be changed data associated with the executed program (e.g., a new customer order). If data has not posted processing loops back to step S620. Otherwise, processing continues to step S625.

In step S625 the processor indicates data has posted. For example, the processor may generate an indication that the data has posted via a message sent to the destination 210. The message including an indication of program execution and what program has posted data.

In step S630 the processor determines if data has been committed. For example, the processor may determine if data has been permanently (as relates to the current data change) stored. If data has not committed processing loops back to step S630. Otherwise, processing continues to step S635.

In step S635 the processor indicates data has been committed. For example, the processor may generate an indication that the data has been committed via a message sent to the destination 210. The message including an indication of program execution and what program has committed data. For example, data that is posted but not committed may eventually be lost.

Figure 7:
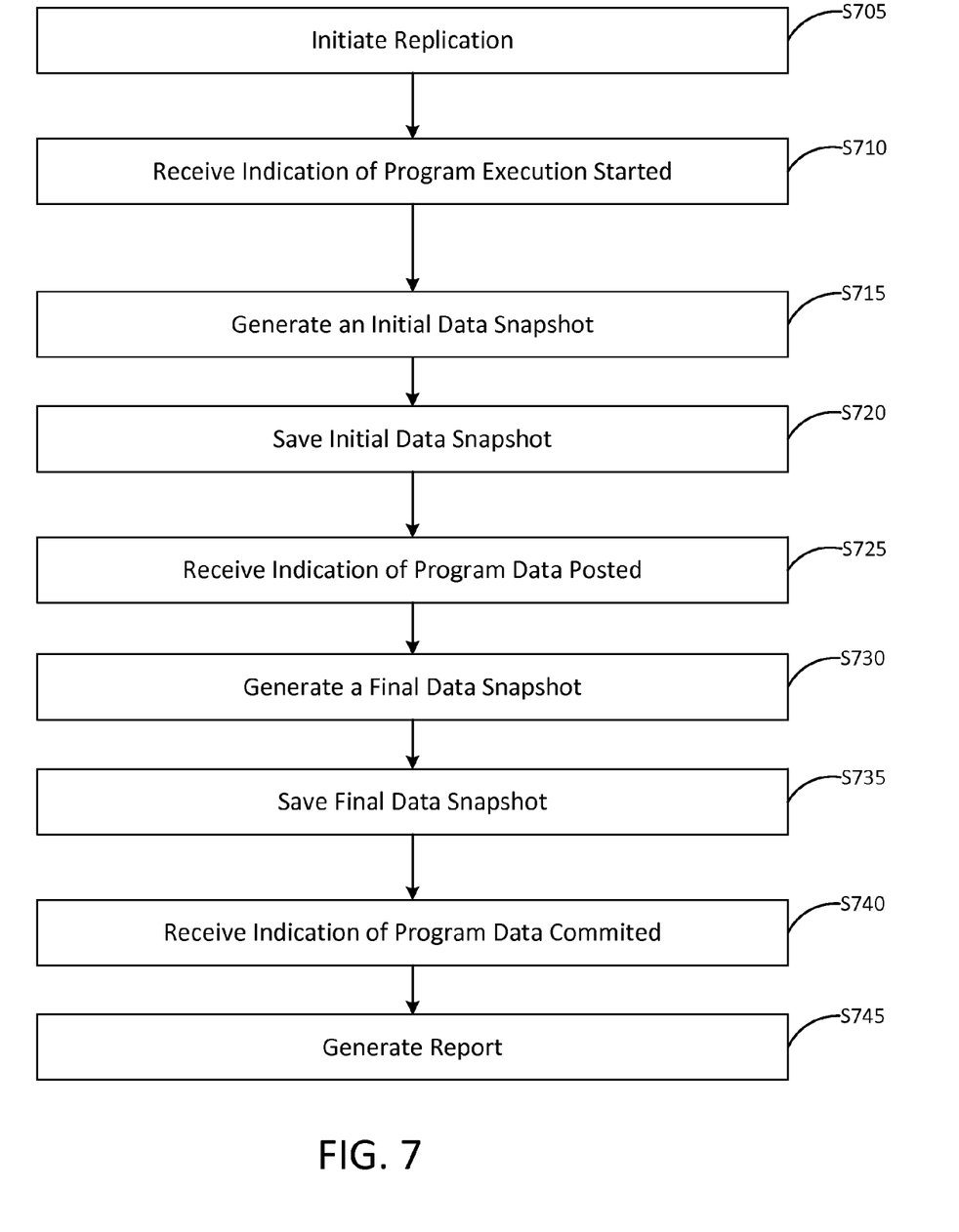
FIG. 7 illustrates a method according to one or more example embodiments.

FIG. 7 illustrates a method according to one or more example embodiments. The steps of FIG. 7 may be performed by a processor associated with a destination device (e.g., destination device 210). As shown in FIG. 7, in step S705 the processor initiates replication. For example, the processor may be executing (or under control of another processor executing) a known replication application (e.g., SLT).

In step S710 the processor receives an indication that a program execution has started. For example, the processor may receive a message from a source system (e.g., source 205). The message may include an indication of program execution and what program has started execution. For example, the program execution may include updating or creating a customer order in an ERP. Therefore, the program may change data (on the source system) associated with a table (being replicated) (e.g., a customer order table).

In step S715 the processor generates an initial data snapshot. For example, the initial data snapshot may be based on the data monitor model described above. For example, the initial data snapshot may be saved in a table as described above. The table may include one or more key and one or more data. The key and the data stored in the table may be hash data representing the key and the data. The table may include a unique identifier associated with the initial data snapshot. The table may include a time stamp associated with the initial data snapshot. The data may be numeric fields representing, for example, quantity and prices. The data may be fields where a change could affect allocation of resources.

In step S720 the processor saves the initial data snapshot. For example, as discussed above, the snapshot may be saved in a table as key-value hash pairs. The table (e.g., Snap_Table 415) may include four fields (e.g., Id, TimeStamp, Key_Hash, and Field_Hash). Although the aforementioned fields are discussed, example embodiments are not limited thereto. For example, system 100 may generate the table to store data snapshots. The snapshot module 125 may generate the data (e.g., aggregate and hash the data) and store the data in the table (e.g., Snap_Table 415). The Id may be a unique identifier of the initial snapshot.

In step S725 the processor receives an indication that program data has posted. For example, the processor may receive a message from a source system (e.g., source 205). The message may include an indication of program execution and what program has posted data. For example, the message may indicate changed data (on the source system) associated with a table (being replicated) (e.g., a customer order table) has been posted.

In step S730 the processor generates a final data snapshot. For example, the final data snapshot may be based on the data monitor model described above. For example, the final data snapshot may be saved in a table as described above. The table may include one or more key and one or more data. The key and the data stored in the table may be hash data representing the key and the data. The table may include a unique identifier associated with the final data snapshot. The table may include a time stamp associated with the final data snapshot. The data may be numeric fields representing, for example, quantity and prices. The data may be fields where a change could affect allocation of resources.

In step S735 the processor saves the final data snapshot. For example, as discussed above, the snapshot may be saved in a table as key-value hash pairs. The table (e.g., Snap_Table 415) may include four fields (e.g., Id, TimeStamp, Key_Hash, and Field_Hash). Although the aforementioned fields are discussed, example embodiments are not limited thereto. For example, system 100 may generate the table to store data snapshots. The snapshot module 125 may generate the data (e.g., aggregate and hash the data) and store the data in the table (e.g., Snap_Table 415). The Id may be a unique identifier of the final snapshot.

In step S740 the processor receives an indication that program data has been committed. For example, the processor may receive a message from a source system (e.g., source 205). The message may include an indication of program execution and what program has committed data. For example, the message may indicate changed data (on the source system) associated with a table (being replicated) (e.g., a customer order table) has been committed.

In step S745 the processor generates a report. For example, the report may be based on the key-value hash pairs stored in the table as the initial and final snapshot. The report may include a comparison of sequential key-value hash pairs stored in the table. For example, the processor may compare key-value hash pairs associated with Id=2 (as the final snapshot) with key-value hash pairs associated with Id=1 (as the initial snapshot). If there is a difference in the data, the report may show that there is a change in the data representing a possible data integrity issues. The following is an example report selection based on the another example above:

```
Select distict mandt, vbeln from
(
Select * from snap where snapid = 1
Minus
Select * from snap where snapid = 2
)
```

Example embodiments may track changes of data being generated or modified during execution of a program by inserting triggers into a destination device or application at the start of the program execution and then dropping the triggers at the end of program execution. Once the program gets executed, example embodiments may generate a report based on data stored in a logging table in order to determine what data has changed.

Figure 8:
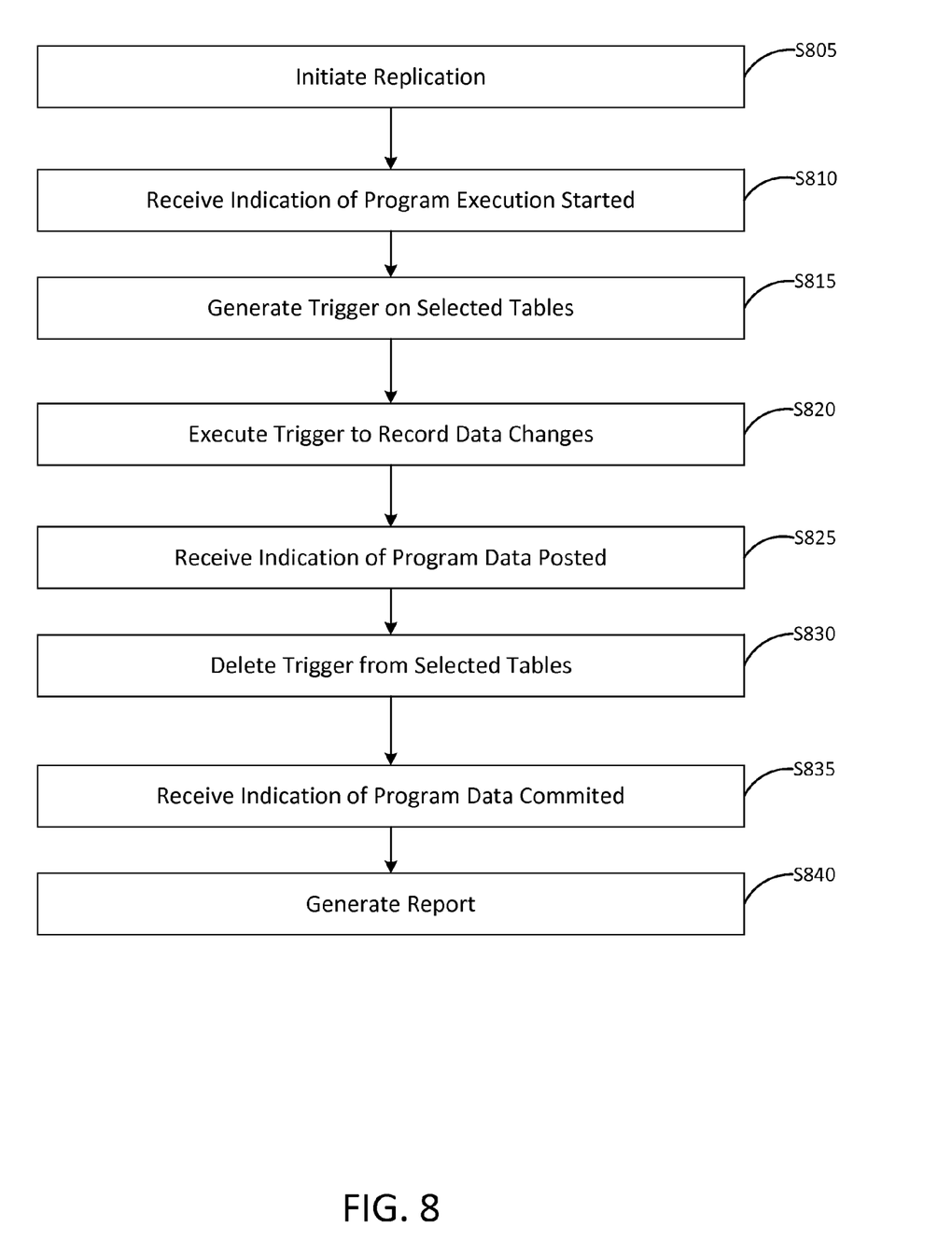
FIG. 8 illustrates a method according to one or more example embodiments.

FIG. 8 illustrates a method according to one or more example embodiments. The steps of FIG. 8 may be performed by a processor associated with a destination device (e.g., destination device 210). Alternatively (or in addition to), the steps of FIG. 8 may be performed by a processor associated with a source device (e.g., source device 205). As shown in FIG. 8, in step S805 the processor initiates replication. For example, the processor may be executing (or under control of another processor executing) a known replication application (e.g., SLT).

In step S810 the processor receives an indication that a program execution has started. For example, the processor may receive a message from a source system (e.g., source 205). The message may include an indication of program execution and what program has started execution. For example, the program execution may include updating or creating a customer order in an ERP. Therefore, the program may change data (on the source system) associated with a table (being replicated) (e.g., a customer order table).

In step S815 the processor generates a trigger on selected tables. The trigger may be generated based on the data monitor model generated by the modeling module 115. The trigger may utilize the trigger and a log table to store changes in data such that system 100 may identify changes that occur during a program execution, log the identified changes (e.g., in a log table) such that the system 100 may detect inconsistencies in the replicated data. The following is an example trigger based on the another example above:

```
DROP TABLE LOG_VBAP;
CREATE TABLE LOG_VBAP (MANDT CHAR(3), VBELN
VARCHAR(10));
CREATE TRIGGER LOG_VBAP_CHANGES AFTER UPDATE ON
VBAP REFERENCING NEW ROW mynewvbap, OLD ROW myoldvbap
FOR EACH ROW
BEGIN
    INSERT INTO LOG_VBAP
VALUES(:myoldvbap.mandt, :myoldvbap.vbeln)
END;
```

In step S820 the processor executes the trigger to record data changes. For example, the trigger may be configured to run every time data changes in the tables and fields associated with the data monitor model.

In step S825 the processor receives an indication that program data has posted. For example, the processor may receive a message from a source system (e.g., source 205). The message may include an indication of program execution and what program has posted data. For example, the message may indicate changed data (on the source system) associated with a table (being replicated) (e.g., a customer order table) has been posted.

In step S830 the processor deletes the trigger from the selected tables. For example, the trigger generated in step S815 may be deleted. As one skilled in the art will appreciate, triggers may be created permanently on all the tables. However, leaving a trigger on for the entire duration of replication causes additional load on a system (e.g., system 100) affecting performance. Preferably, creating and dropping the trigger and such that the trigger functions during the time period of program execution results in improved system performance.

In step S835 the processor receives an indication that the program data has been committed. For example, the processor may receive a message from a source system (e.g., source 205). The message may include an indication of program execution and what program has committed data. For example, the message may indicate changed data (on the source system) associated with a table (being replicated) (e.g., a customer order table) has been committed.

In step S840 the processor generates a report. For example, the report may be based on the log table storing changes in data as generated by the trigger. The report may include all or a portion of the entries in the log table. If there is a change in the data, the report may show that there is a change representing a possible data inconsistency issues. The following is an example report selection based on the another example above:

Select*from LOG_VBAP

Although not shown, a report may generated to include the report from step S745 and step S840.

After data integrity check and inconsistency check, a comparison report may be generated to show the data changes during the specific period of time. Step S840 may be performed before step S835. In this case, a user receiving the report may decide whether or not to commit the data (e.g., commit anyway or commit without changes). Users may review the report first in order to determine information about the changes. Afterwards, the user may make a decision on how to continue with the replication process taking into consideration these changes.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for monitoring data changes during a data replication process, the method comprising:
   receiving an indication that a program execution has started;
   generating an initial data snapshot of replicated data;
   receiving an indication that a program data has posted;
   generating a final data snapshot of the replicated data; and
   generating a report based on the initial data snapshot and the final data snapshot.

2. The method of claim 1, wherein
   the replication process includes copying data from a source system to a destination system;
   the program execution has started on the source system;
   the indication that a program execution has started is received by the destination system from the source system; and
   the indication that a program data has posted is received by the destination system from the source system.

3. The method of claim 1, wherein
   the replication process includes copying data from a source system to a destination system; and
   the destination system is a high-performance analytic appliance (HANA).

4. The method of claim 1, further comprising:
   generating a data monitor model, the data monitor model including a reference to at least one table to be monitored and at least one snapshot table, wherein
   generating the initial data snapshot of replicated data includes copying data from the at least one table to be monitored in the at least one snapshot table, and
   generating the final data snapshot of replicated data includes copying data from the at least one table to be monitored in the at least one snapshot table.

5. The method of claim 1, wherein
   the initial data snapshot and the final data snapshot are sequential snapshots stored in a snapshot table; and
   generating the report includes a comparison of the sequential snapshots.

6. The method of claim 1, wherein the initial snapshot data and the final snapshot data include key data and variable numeric data.

7. The method of claim 1, wherein the initial snapshot data and the final snapshot data include key data linking a plurality of tables.

8. The method of claim 1, wherein the initial snapshot data and the final snapshot data include first hash data representing key data and second hash data representing variable numeric data.

9. A method for monitoring data changes during a data replication process, the method comprising:
   receiving an indication that a program execution has started;
   generating a trigger on at least one table associated with the program;
   executing the trigger such that data changes are logged;
   receiving an indication that a program data has posted;
   deleting the trigger; and
   generating a report based on the logged data changes.

10. The method of claim 9, wherein
    the replication process includes copying data from a source system to a destination system;
    the program execution has started on the source system;
    the indication that a program execution has started is received by the destination system from the source system; and
    the indication that a program data has posted is received by the destination system from the source system.

11. The method of claim 9, wherein
    the replication process includes copying data from a source system to a destination system; and
    the destination system is a high-performance analytic appliance (HANA).

12. The method of claim 9, further comprising:
    generating a data monitor model, the data monitor model including a reference to the at least one table as a table to be monitored, wherein
    generating the trigger includes generating a log table configured to store data changes; and
    generating the report includes reporting each of the changes stored in the log table.

13. A system for monitoring data changes during a data replication process, the system comprising at least one memory and instructions that when executed by at least processor cause the at least one processor to:
    select tables and fields to be monitored during execution of the data replication process;
    track changes of data being generated during execution of a program by inserting triggers into a destination system at the start of a program execution and then dropping the trigger at the end of program execution;
    track changes of data being generated during execution of the program by generating a snapshot of data at the beginning and the end of program execution; and generate a report indicating changes in data based on the changes in data indicated by the triggers and based on the changes in data indicated by the snapshots of data.

14. The system of claim 13, wherein the instructions that when executed by at least processor further cause the at least one processor to:
generate a monitor model including the selected tables and fields, and wherein
at least one of the fields includes a key linking the selected tables.

15. The system of claim 13, wherein the instructions that when executed by at least processor further cause the at least one processor to generate a log table to store changes in data identifying changes that occur during the program execution as generated by the trigger.

16. The system of claim 13, wherein the instructions that when executed by at least processor further cause the at least one processor to:
receive an indication that the program execution has started from the source system; and
receive an indication that the data has posted from the source system.

17. The system of claim 13, wherein the instructions that when executed by at least processor further cause the at least one processor to:
receive an indication that the program execution has started from the source system; and
receive an indication that the data has posted from the source system.

18. The system of claim 13, the instructions that when executed by at least processor further cause the at least one processor to: generate initial snapshot data and final snapshot data to include first hash data representing key data and second hash data representing variable numeric data.

19. The system of claim 13, wherein the instructions that when executed by at least processor further cause the at least one processor to:
generate a log table configured to store the data changes;
generate a snapshot table configured to store initial snapshot data and final snapshot data;
generate the report including reporting each of the changes stored in the log table and data differences between the initial snapshot data and the final snapshot data.

20. The system of claim 13, wherein the replication process includes copying data from a source system to a destination system; and
the destination system is a high-performance analytic appliance (HANA).

* * * * *